Nov. 25, 1969 P. A. THOMAS 3,480,941

PARTS DETECTOR CONTROL

Filed Nov. 29, 1966 2 Sheets-Sheet 1

INVENTOR.
Paul A. Thomas
BY
Warren D. Hill
ATTORNEY

Nov. 25, 1969     P. A. THOMAS     3,480,941
PARTS DETECTOR CONTROL
Filed Nov. 29, 1966     2 Sheets-Sheet 2
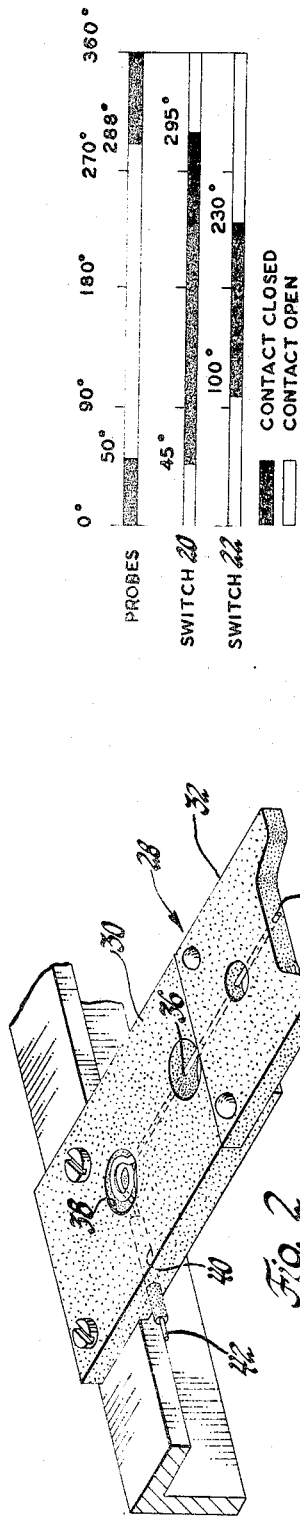
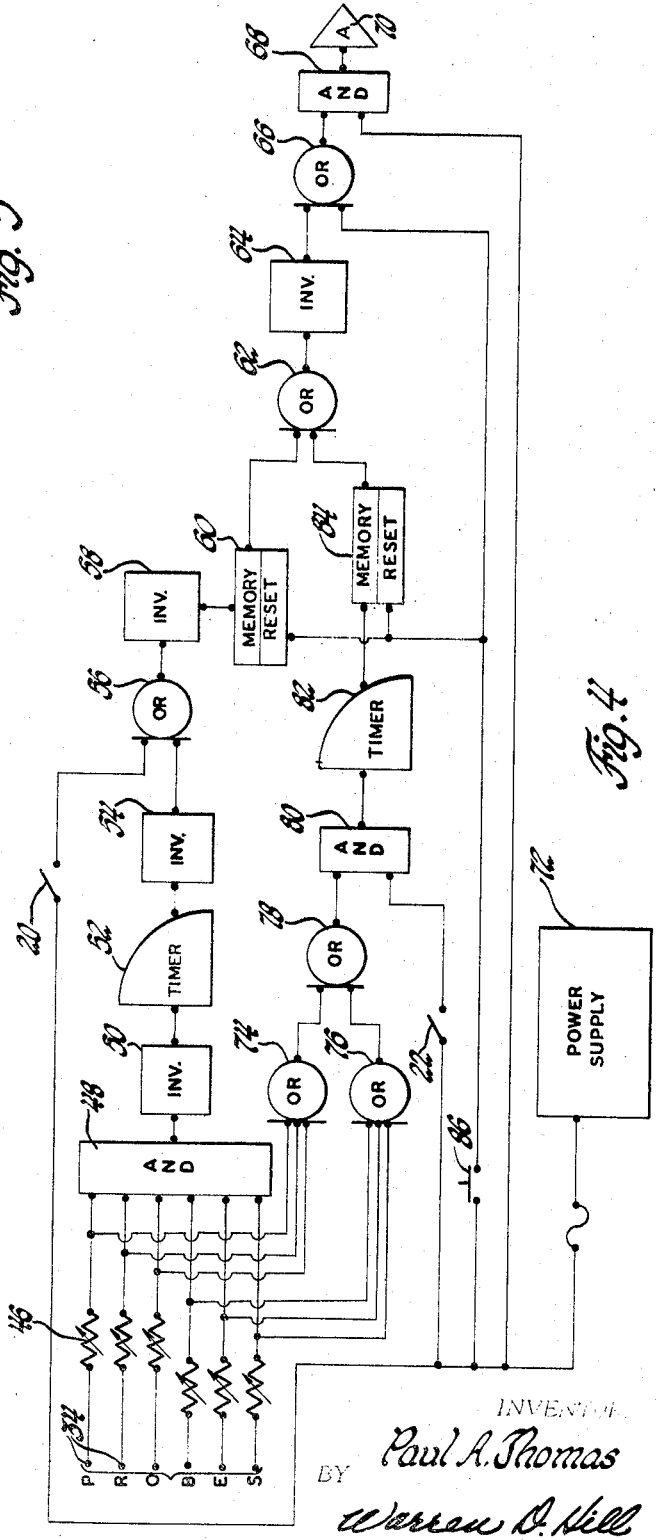
INVENTOR
Paul A. Thomas
BY
Warren D. Hill
ATTORNEY United States Patent Office 3,480,941
Patented Nov. 25, 1969

3,480,941
PARTS DETECTOR CONTROL
Paul A. Thomas, Lockport, N.Y., assignor to General Motors Corporation, Detroit, Mich., a corporation of Delaware
Filed Nov. 29, 1966, Ser. No. 597,685
Int. Cl. G08b *21/00;* H02b *1/24*
U.S. Cl. 340—259                                    17 Claims

ABSTRACT OF THE DISCLOSURE

A machine control circuit for detecting missing parts in a transfer device has several probes, each in contact with a part during transfer between work stations. A logic circuit connected with the probes monitors the presence of the parts throughout substantially the entire transfer cycle and monitors shorting of the probes during a non-transfer portion of the machine cycle. The circuit halts machine operation if either a missing part or a shorted probe is detected.

---

This invention relates to a machine control circuit and particularly to a circuit for detecting missing parts in a transfer device.

In a machine such as one having a plurality of work stations, transfer devices are used to move the parts being operated upon by the machine from one station to another. It sometimes happens that the parts transfer function is not properly carried out due to a malfunction such as a part being dropped by a transfer device between the stations or by a part not being removed from its last station. In this event, considerable damage can occur not only to the parts, but more importantly, to the machine, e.g., expensive dies may be broken resulting in costly repairs and removing the machine from service during repairs. To prevent such accidents, parts detector control circuits are commonly used in an attempt to determine whether parts are being properly carried from one station to another by the transfer device, and to immediately stop operation of the machine if it is found that a part is missing in any section of the transfer device.

It has been found that previous parts detector controls are unsatisfactory for several reasons and that machines have been damaged in spite of the use of such controls. For example, the controls frequently utilize electrical probes in the transfer fingers, which probes send signals to the control circuit to indicate that the parts are present in the transfer fingers during the transfer cycle of the machine. However, it sometimes occurs that a part will drop from the transfer fingers after the signal has been transferred to the control circuit and no information regarding this incident is fed to the control circuit. Further, the probes sometimes become shorted so that they will give a parts present signal even when a part is missing. Although some attempts have been made in the past to safeguard against shorts by indicating to the control circuit that a probe is shorted, such devices tend to give false indications of shorts in the probes where coolant splashes on the probe to produce a momentary and harmless shorted condition.

It is a general object of this invention to provide a machine control circuit for a parts transfer control device.

It is another object of this invention to provide a parts detection control circuit which continuously monitors the presence of parts in the transfer device throughout substantially the entire transfer cycle.

It is a further object of the invention to provide a control circuit for detecting shorts with a part sensing probe in a transfer mechanism exclusive of momentary shorts.

It is yet another object of this invention to provide a parts detection control circuit which provides an output signal to stop machine operation upon receipt of a signal indicative of a missing part, but which is not responsive to momentary missing part signals.

The invention is carried out by providing a logic circuit for use in conjunction with the parts transfer sensing probes, which circuit continually monitors the probes throughout substantially the entire transfer cycle to insure that a warning is received upon the absence of a part during any portion of the transfer cycle. A further feature of the invention is carried out by providing means to discriminate between spurious momentary warnings and warnings of long duration.

The invention is further carried out by providing a circuit for testing long duration shorts of the probes during the non-transfer portion of the machine cycle. More specifically, the invention is carried out by providing a circuit for generating a signal responsive to a missing part during any portion of the transfer cycle, a further circuit for generating a signal responsive to malfunctions of the sensor and an output circuit connected to both said circuits to stop operation of the machine upon receipt of any such signals.

The invention is further carried out by providing a machine control circuit including a first logic circuit for indicating missing parts, means for rendering the logic circuit ineffective during the non-transfer portion of the machine cycle and in addition may include a second logic circuit for detecting shorts in the parts sensing means and a means for rendering the second logic circuit ineffective during the transfer cycle.

The above and other advantages of the invention will be made more apparent from the following specification taken in conjunction with the accompanying drawings wherein like reference numerals refer to like parts and wherein:

FIGURE 2 is a perspective view of a transfer finger incorporating a parts sensing probe;

FIGURE 3 is a chart illustrating the program of cam-operated switches and probe contacts on the machine of FIGURE 1; and, FIGURE 4 is a diagram of a logic circuit for a parts detector control according to the invention.

Figure 1:
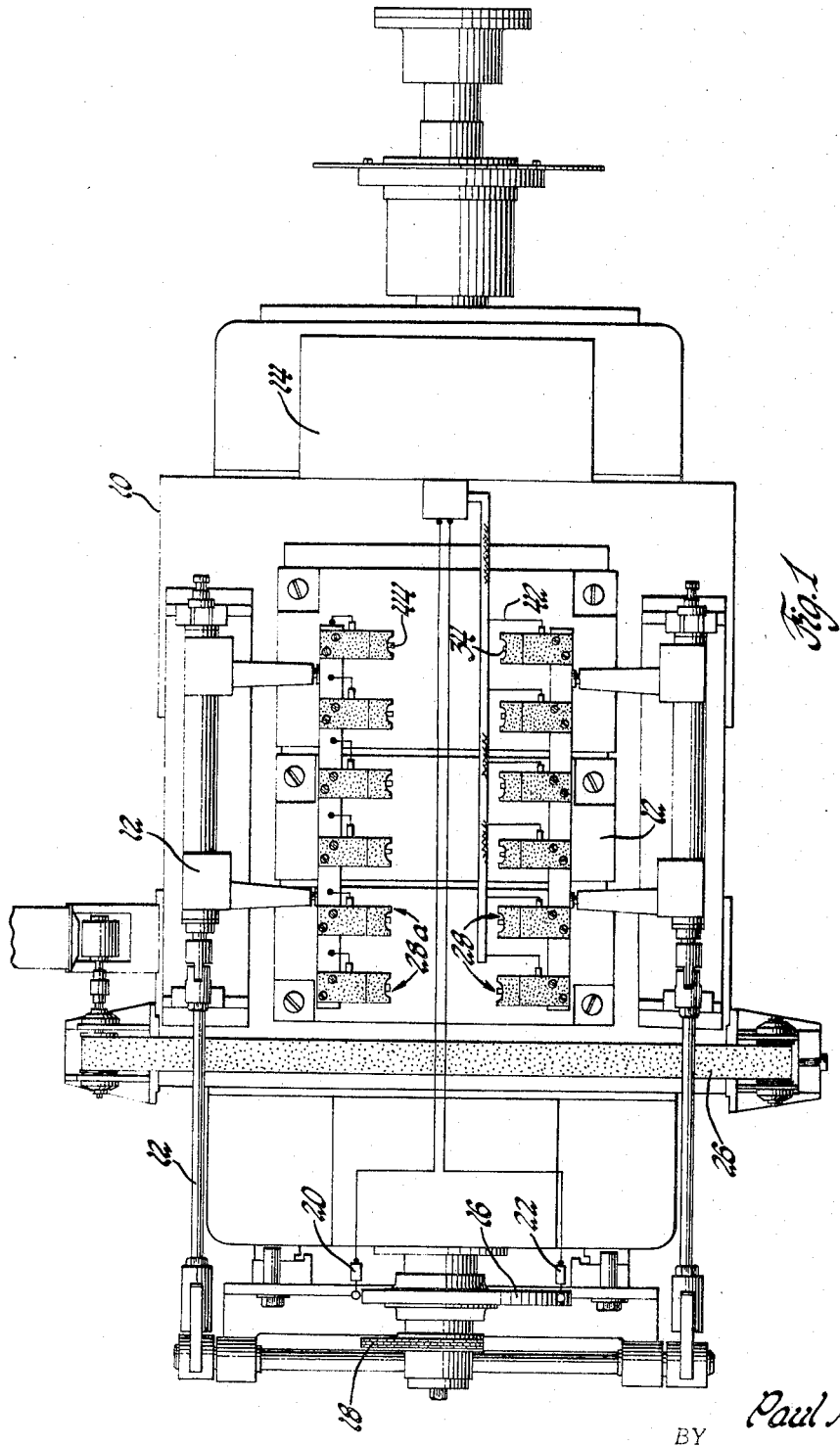
FIGURE 1 is a plan view of the bed portion of a multi-stage machine tool having a transfer device thereon.

In FIGURE 1 there is shown the bed of a transfer press 10 of conventional structure. The press is intended to incorporate six stamping stations, each represented by a die set, not shown, located along the center line of the press bed. A transfer mechanism 12 is mounted on the press for mechanically moving parts from one stage to another. Many details of the press and the transfer device are not described herein as they are well known to those skilled in the art. A parts detection control panel 14 is mounted on the press and is electrically connected to the transfer device and to the press mechanism for stopping press operation upon malfunction of the transfer device. A cam 16 is mounted on one end of the press and is driven by chain 18, which in turn is driven by the main overhead cam, not shown, so that the rotary movement of the cam 16 is synchronized with the stamping head of the press. Two cam switches, 20 and 22 are mounted on the press adjacent the cam 16 for control thereby. The cam switches are electrically connected to the control panel 14. A conveyer belt 26 is mounted on the press in such a manner to carry finished parts from the press. The transfer mechanism 12 includes six opposed pairs of transfer fingers 28 and 28a, each pair being generally disposed in the location of an operating station for the purpose of grasping parts at each station and moving them to the next station. The pair of transfer fingers located nearest the conveyer belt 26 moves the parts from the last station to the conveyer belt. As best shown in FIGURE 2, the transfer fingers 28 each comprise a nylon body portion 30 secured to the transfer mechanism at one end. The other end of body 30 has secured thereto a rubber tip 32 shaped to conform to the part being transferred. Sensing probe 34 is carried in a longitudinal bore 36 in the transfer finger and extends from just beyond the end of the rubber tip 32 to a circular cavity 38 in the body portion 30 where the probe wire is wound in coil form like a spring and then extends laterally through a second bore 40 in the body 30 to a point outside the transfer finger where the probe is connected to a conductor 42. The conductors 42 for the several transfer fingers are each carried separately through a six strand cable to the parts detection control panel 14. It will thus be seen that due to the spring-like coil portion of the probe within cavity 38, the end of the probe resiliently protrudes beyond tip 32 to make contact with a part which may be engaged by the transfer finger 28. Since the parts normally are in contact with the press bed even during the transfer movement, the probes will be electrically grounded when in contact with the parts and this information is transferred to the control panel by conductors 42. To provide for additional ground in cases where the transfer fingers might lift up the part during transfer, auxiliary probes 44 are placed in the transfer fingers 28a which oppose fingers 28. The probes 44 are similar in structure to probes 34 but are connected to ground. Thus as appears from the description of FIGURES 1 and 2, the control panel 14 receives signals from the six transfer fingers 28 and from the cam switches 20 and 22.

The chart of FIGURE 3 illustrates the programming of the cam switches 20 and 22. 0° on the chart is that position of the cam which corresponds to the open position of the press while 180° corresponds to the bottom position of the press head. As indicated by the first black line, in normal operation the probes will be in contact with the parts during the period of 288° through 50°, which covers the entire time of the transfer portion of the cycle. The cam switch 20 will be closed during the period of 45° to 295° as shown by the second line of the chart and, as indicated by the third line, the cam switch 22 will be closed throughout the period of 100° to 230°. The significance of this programming will become more apparent from a consideration of the circuit shown in FIGURE 4.

Each sensing probe 34 is connected in series with a variable resistance 46. The variable resistances have the function of controlling the sensitivity of the probes and are manually adjustable. All six signals from the probes 34 which are fed through the variable resistors 46 are further fed to an AND gate 48, the output of which proceeds to an inverter 50. From there the signal progresses serially through timer 52, inverter 54, OR gate 56, inverter 58 to memory 60 to thereby comprise a circuit for detecting missing parts in the transfer fingers. The output of the missing part memory 60 is fed serially through OR gate 62, inverter 64, OR gate 66, and AND gate 68 to a relay output amplifier 70. The amplifier 70 is operatively connected to the machine control to stop machine operation upon receipt of an appropriate signal. The OR gate 56 has a second input which is a signal from the cam switch 20 which is connected in series between a power supply 72 and the input of OR gate 56. The timer 52 is operative to start timing only upon receipt of an "On" signal and is preset for 0.1 second so that it will transmit an "On" output signal after that amount of delay. An "Off" signal will be transmitted through the timer without delay. When, during the transfer cycle, the sensing probes 36 are properly in contact with the grounded parts, a zero voltage or "On" signal is transmitted by each probe to AND gate 48 which will then accordingly have an "On" output which is changed to an "Off" output by the inverter circuit 50, the inverter simply being a device such as a flip-flop circuit which has a signal level output opposite to that of the input. A timer 52 receiving the "Off" signal operates merely to transmit the "Off" signal to the inverter 54 which has an "On" output. Consequently, the OR gate 56 will have an "On" output, the inverter 58 will have an "Off" output and the missing part memory 60 similarly will have an "Off" output. However, in the case where a part is missing from any one of the transfer fingers, one of the probes 34 will develop an "Off" signal so that the AND gate will have an "Off" output and converter 50 will have an "On" output which will actuate the timer 52. The timer 52 will time out after 0.1 second causing the timer to produce an "On" output and the inverter 54 to have an "Off" output. Assuming the switch 20 is open, the OR gate will have two "Off" inputs so that ultimately the memory 60 will have an "On" output and an AND gate 68 will have an "Off" output causing the relay amplifier 70 to stop machine operation. In the event that the transfer fingers are all properly holding parts but one of the parts should bounce causing only a momentary "Off" signal to AND gate 48 of less than one-tenth second, the timer 52 will not time out thereby preventing an "Off" signal from reaching the relay amplifier 70 to avoid a false indication of a transfer malfunction. During the non-transfer portion of the cycle, when the transfer fingers are not in contact with parts, means are provided for blocking the missing parts signal in the missing parts circuit. This blocking means is the circuit containing swtch 20 between the power supply and the OR gate 56. During a non-transfer portion of the cycle, the switch 20 is closed as shown in FIGURE 3 so that an "On" signal is fed to the input of OR gate 56 thereby rendering ineffective the "Off" signal which will come from the output of inverter 54. The purpose of using several inverters in the circuit is to match the output of each gate or timer to the following input. For example, since the timer is responsive only to an "On" input, an inverter 50 is used to change the "Off" output of the AND gate 48 to "On" to start the timer running. Also, the inverter 54 supplies an "Off" signal to OR gate 56 during the non-transfer portion of the machine cycle, and only the "On" signal from switch 20 prevents the machine from being shut down. Accordingly, if the timed signal from switch 20 is interrupted by a broken wire, the press will be shut off, thereby providing a fail-safe feature. In practice, commercially available gate and timer modules are equipped with internal inverter circuits and are provided with external terminals so that both direct and inverted outputs are available.

In order to assure that the sensing probes 34 are functioning properly to give an "Off" signal when a part is missing, it is necessary to monitor the probes to check for electrical shorts. A short checking means is provided to operate during a portion of each non-transfer cycle portion when the switch 22 is closed. This function is carried out by connecting the probes to a cascade of OR gates 74, 76 and 78, the output of which is connected to one input of AND gate 80. The switch 22 is connected between the power supply 72 and the other input of AND gate 80. The AND gate output is fed to timer 82 thence to the short memory 84 which has its output connected to the input of the OR gate 62. The timer is set to time out at 0.05 second. In operation, provided the switch 22 is closed to effect an "On" signal to one input of AND gate 80, any shorting of a probe will produce an "On" signal at the input of the OR gate cascade and at the other input of AND gate 80. The resultant "On" output of AND gate 80 will start the timer 82, which, if it does time out, will cause an "On" input and output at the short memory 84. The 'On' output will then effect an "Off" signal at the relay amplifier 70 to stop the machine. It sometimes occurs, however, that harmless momentary short signals will be produced due to coolant splashing on the transfer fingers. To allow the short checking circuit to ignore such spurious signals, the timer 82 is set for 0.05 second and accordingly, will not time out to transmit the "On" signal for such brief shorting incidents.

The memory units 60 and 84 are retentive memories to assure that when the machine has been turned off due to a missing part or a short, it will not again be operated inadvertently until the fault is corrected. However, a reset and override circuit is provided comprising a manually operated switch 86 connected between the power supply 72 and OR gate 66 and also connected to the reset portions of the memory units 60 and 84. By manually operating switch 86 an "On" signal will be transmitted to OR gate 66 allowing the press to operate when necessary, for example, to open the press for repair or for feeding in a new roll of stock. Manually closing the switch 86 will also cause the memories to reset provided that the malfunction has been eliminated and the normal "Off" signals are being supplied to the memory input.

A fail-safe circuit is provided which comprises a conductor extending from the power supply to the AND gate 68 to perpetually provide an "On" input to that AND gate provided the power supply is operative; thereby allowing the AND gate to produce an "On" output so long as the memory units both have "Off" outputs as occurs during normal trouble free operation. But, if the power supply fails due to an open fuse, for example, the "On" output will be removed from AND gate 68 and the machine will be shut off.

It will thus be seen that the circuit according to this invention is capable of monitoring the transfer of parts during substantially the entire transfer portion of the machine cycle and to shut off the machine if a part is missing during any portion of the transfer cycle thereby providing an improvement over previous circuits which monitor the transfer operation only during a very small part of the cycle. Similarly, the circuit according to the invention provides a means for checking for shorts of the probes during a portion of each machine cycle thereby avoiding false "safe" signals of the probes due to probe malfunctions. Both circuits however are non-responsive to the frequently occurring brief signals due to bouncing parts in the transfer fingers or due to coolant splash on the transfer fingers.

What is claimed:

1. A machine control circuit for detecting missing parts in a parts transfer device comprising at least one part sensor, first circuit means operative throughout substantially the entire operation of the transfer device for generating a signal responsive to a missing part, the first circuit means including the sensor, second circuit means including the sensor for generating a signal corresponding to malfunctions of the sensor, and a machine control means connected to the first and second circuit means for issuing a machine stop signal upon receipt of any of said signals.

2. A control circuit as described in claim 1 including a plurality of part sensors, each sensor being included in the first and second circuit means.

3. A control circuit as described in claim 2 including blocking circuit means connected with the first circuit means for blocking the missing part signal during periods when the parts transfer device is normally not in contact with parts.

4. A control circuit as described in claim 3 including time delay means in the first circuit means for arresting transient signals only so that momentary indications of missing parts do not trigger machine stop signals.

5. A control circuit as described in claim 4 including second blocking circuit means connected with the second circuit means for blocking the malfunction signal during periods when the parts transfer device is normally in contact with parts.

6. A control circuit as described in claim 5 including time delay means in the second circuit means for arresting transient signals only so that momentary indications of sensor malfunctions do not trigger machine stop signals.

7. A control circuit as described in claim 6 wherein the first and second circuits each contain a memory device at their outputs to sustain the output signals.

8. A control circuit as described in claim 7 including a manual override circuit connected to the machine control means to overcome the effect of the signals.

9. A control circuit as described in claim 8 including a power failure detection means connected to the machine control means for causing the machine control means to issue a machine stop signal upon failure of power to the machine control circuit.

10. In a machine control circuit, means for detecting missing parts, comprising a plurality of part sensing means each for producing a signal indicative of a missing part, an AND gate having the sensing means connected thereto as inputs, a timer in series circuit with the AND gate, an OR gate having one input connected to the timer output, and a blocking circuit connected to another input of the OR gate, the blocking circuit comprising means to produce a timed signal at the OR gate to periodically block signals from the timer from passing through the OR gate, whereby the OR gate will have an output indicative of whether there is a missing part signal whenever there is no blocking signal applied to the OR gate.

11. A machine control circuit as described in claim 10 including means for detecting shorts in the part sensing means comprising means for connecting the sensing means to a second OR gate, a second AND gate having its input connected to the output of the second OR gate, a further blocking circuit connected to another input of the second AND gate and comprising means to produce a timed signal at the second AND gate to periodically block signals from the second OR gate from passing through the second AND gate whereby the second AND gate will have an output indicative of whether there is a short in the sensing means, and a second timer connected to the output of the second AND gate for inhibiting transient signals.

12. A machine control circuit as described in claim 11 wherein the outputs of the first mentioned OR gate and the second timer are fed to memories.

13. A machine control circuit as described in claim 12 wherein the memory outputs are fed to a common OR gate, and including a machine control means fed by the output of the common OR gate for producing a machine stop signal upon receipt of a signal from either memory.

14. In a control for a machine having a parts transfer mechanism, means for monitoring the presence of parts in the transfer mechanism including a circuit means having at least one input signal from the transfer mechanism for continuously monitoring the presence of parts throughout substantially the entire transfer operation and for producing an output signal indicative of all parts being present, and means within the circuit means for sustaining the output signal during momentary lapses of an input signal.

15. In a control for a machine as described in claim 14 wherein the means for sustaining the output signal comprises a timing device preset for a predetermined time delay.

16. In a control for a machine having a parts transfer mechanism; means for monitoring the presence of parts in the transfer mechanism including a circuit means for continuously monitoring the presence of parts throughout substantially the entire transfer operation and for producing an output signal indicative of all parts being present; the transfer mechanism having sensing probes in the said circuit means for producing signals indicative of parts being present, the sensing probes producing similar signals upon being shorted; and further circuit means for monitoring the sensing probes to detect shorts thereof and for producing a second output signal indicative of no shorts being present.

17. In a control for a machine as described in claim 16 wherein the said further circuit means includes a time delay circuit for sustaining the output signal thereof during momentary shorts of the sensing probes.

References Cited

UNITED STATES PATENTS

| | | | |
|---|---|---|---|
| 2,698,929 | 1/1955 | Greacen et al. | 340—267 X |
| 3,319,087 | 5/1967 | Wintriss | 307—112 |
| 3,339,195 | 8/1967 | Murley | 340—259 |

JOHN W. CALDWELL, Primary Examiner

P. PALAN, Assistant Examiner

U.S. Cl. X.R.

307—112; 340—267